United States Patent [19]
Zaiser

[11] 3,905,252
[45] Sept. 16, 1975

[54] AUTOMATIC PLANETARY GEAR CHANGE-SPEED TRANSMISSION FOR MOTOR VEHICLES

[75] Inventor: Wolfgang Zaiser, Althutte, Germany

[73] Assignee: Daimler-Benz Aktiengesellschaft, Germany

[22] Filed: Nov. 28, 1973

[21] Appl. No.: 419,712

[30] Foreign Application Priority Data
Nov. 28, 1972 Germany............................ 2258137

[52] U.S. Cl. ..................... 74/759; 74/740; 74/753; 74/606 R
[51] Int. Cl.² .................... F16H 57/02; F16H 57/10
[58] Field of Search ............. 74/740, 753, 759, 763, 74/745, 606 R

[56] References Cited
UNITED STATES PATENTS

| | | | |
|---|---|---|---|
| 2,066,873 | 1/1937 | Barnes | 74/740 |
| 2,328,291 | 8/1943 | Osborne | 74/740 |
| 2,917,951 | 12/1959 | Aschauer | 74/763 X |
| 3,280,656 | 10/1966 | General | 74/732 X |
| 3,290,962 | 12/1966 | McCann et al. | 74/760 |
| 3,319,491 | 5/1967 | Simpson | 74/740 |
| 3,596,537 | 8/1971 | Kolvunen | 74/759 |

*Primary Examiner*—Samuel Scott
*Assistant Examiner*—John Reep
*Attorney, Agent, or Firm*—Craig & Antonelli

[57] ABSTRACT

An automatically shifting change-speed transmission for motor vehicles which is constructed as a basic transmission having three speeds and prepared for the connection of an auxiliary gear and which contains inside a uniform housing all aggregates necessary for an independent functioning such as, for example, pressure controller, parking brake, shifting plate, etc.; the housing of the basic transmission is provided on the output side inwardly with a sleeve extension and outwardly with a flanged part for the mounting and fastening of a first auxiliary gear; the output shaft of the basic transmission is also constructed as hollow shaft to permit the input shaft of a first auxiliary gear to be extended therethrough whereby the hollow shaft is adapted to be closed at its end by a disengageable sealing plug; the input shaft of the basic transmission is provided at its end facing the output with a plug connection or the like for connection of the input shaft of a first auxiliary gear.

29 Claims, 9 Drawing Figures

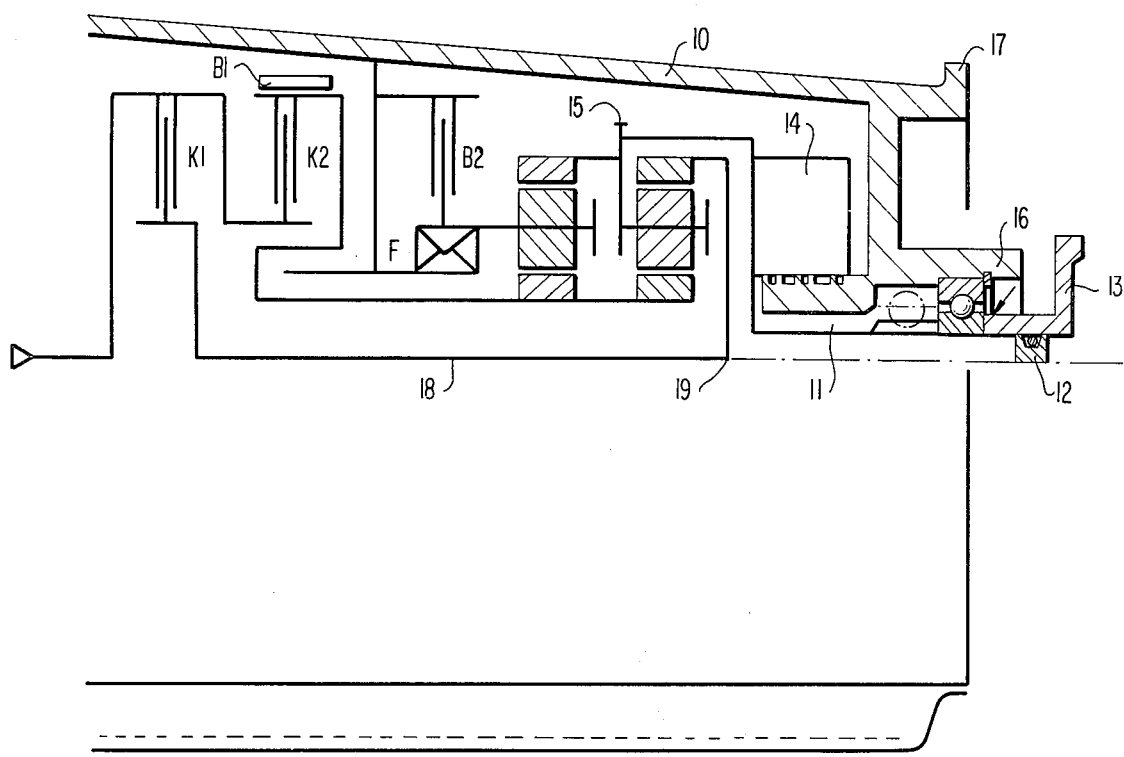
|   | K1 | K2 | B1 | B2 | F |
|---|---|---|---|---|---|
| I | × |   |   | (×) | × |
| II | × |   | × |   |   |
| III | × | × |   |   |   |
| R |   | × | × |   |   |
FIG. 1a
FIG. 1
FIG. 3
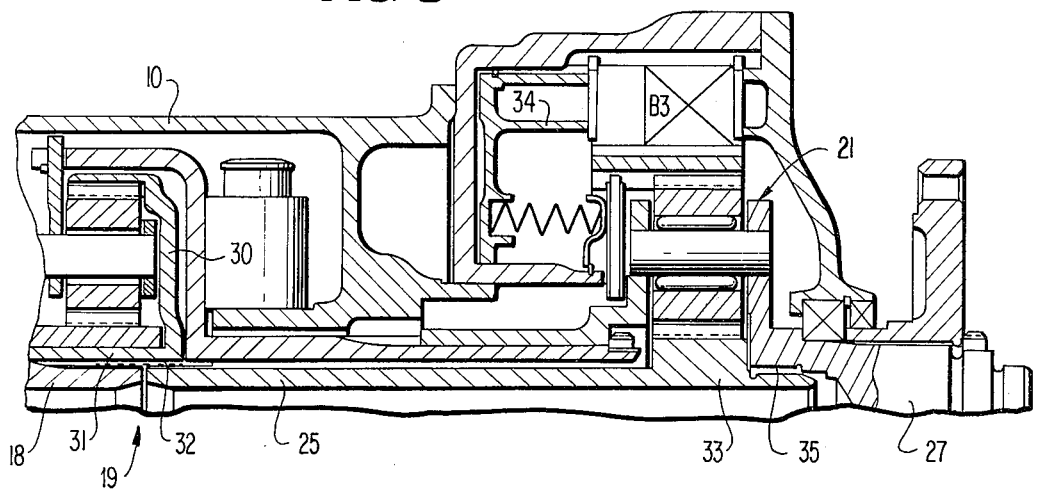

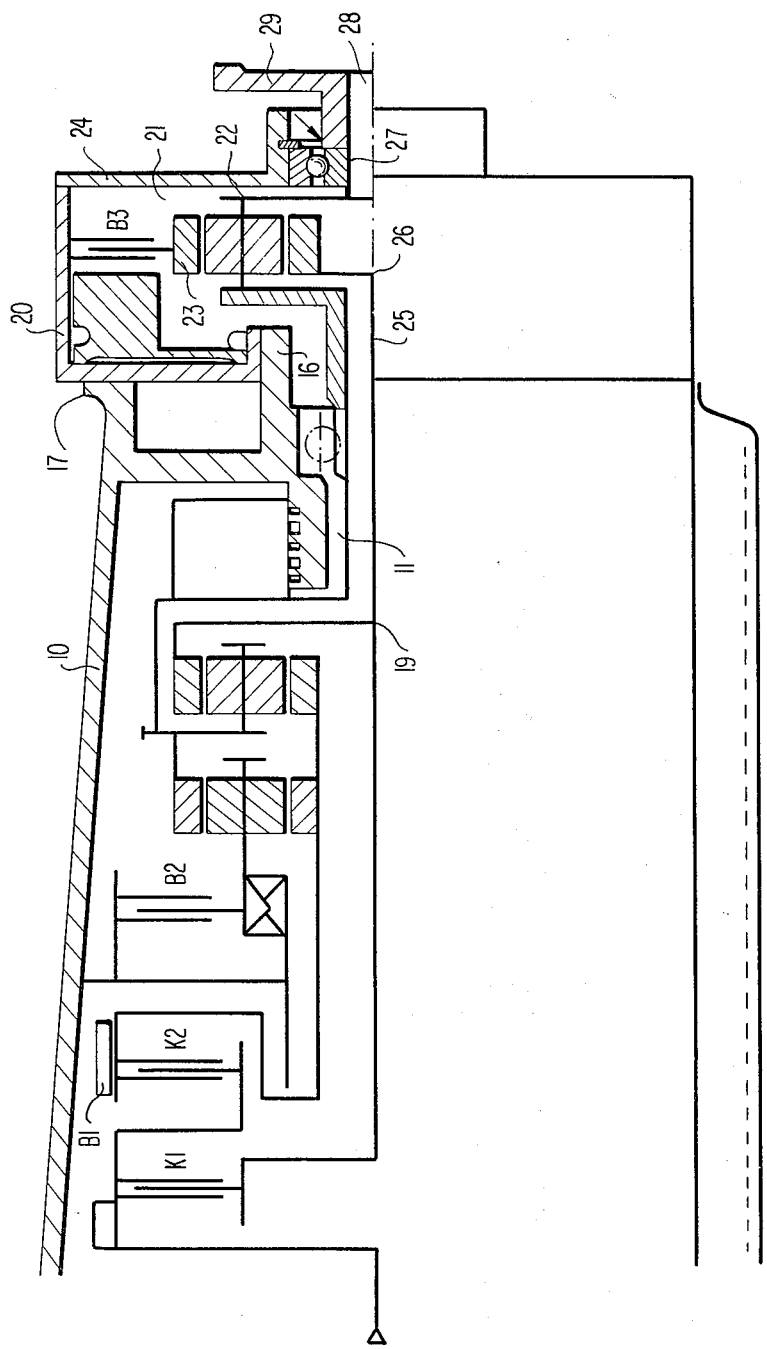

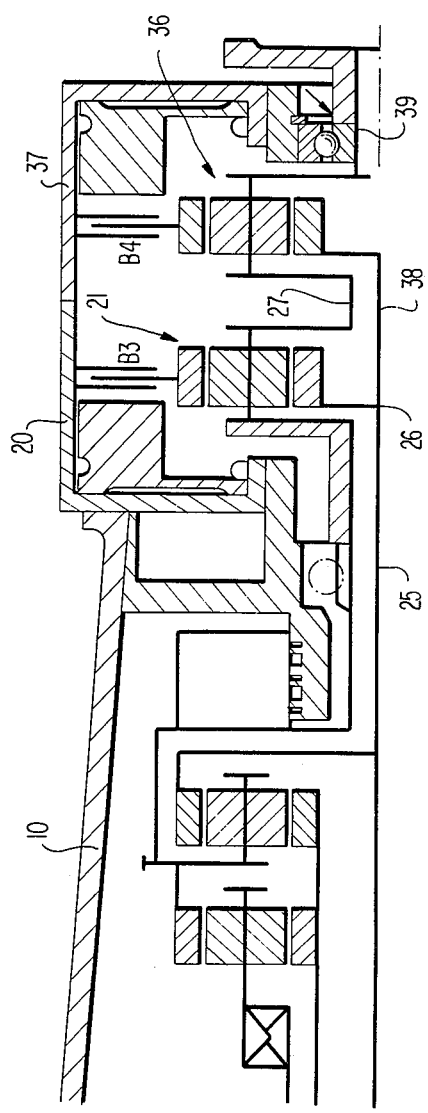

AUTOMATIC PLANETARY GEAR CHANGE-SPEED TRANSMISSION FOR MOTOR VEHICLES

The present invention relates to an automatically shifting planetary-gear change-speed transmission for motor vehicles which is constructed as basic transmission with three speeds prepared for the connection of auxiliary or additional transmissions and contains in a standard housing all aggregates necessary for an automatic functioning such as, for example, pressure controller, parking brake, shifting plate, etc.

It is desirable in principle to construct transmissions for different types of motor vehicles in the manner of a building-block system. Thus, it would be quite feasible, starting from a basic transmission, to obtain certain multi-speed transmissions, for example, for larger passenger motor vehicles, by corresponding additional gears or transmissions which could then be usable for a medium size commercial vehicle such as a medium-sized truck. The same is also feasible with different types of engines in a passenger motor vehicle or truck program.

It is known in the prior art to enlarge certain basic transmissions by connecting a planetary gear set in front or to the rear thereof. However, this takes place always more or less in that these additionally connected planetary gear sets are accommodated in the same housing and that also some auxiliary aggregates such as, for example, pressure controller and parking lock or parking brake are then coordinated to the auxiliary gear. This, however, requires a structural change, especially at the housing and to a large extent also at the inner parts of the transmission so that in the end result no simplification results in the manufacture and in the stocking of spare parts as also in the assembly or repair.

The present invention is concerned with the task to avoid these disadvantages. Consequently, a transmission is proposed which can be enlarged building-block-like by the coordination of one or two or even more additional auxiliary gears whereby as many individual parts as possible remain the same and whereby above all the basic transmission or the respective preceding transmission of the series-connected transmissions remains preserved as independent unit capable of functioning by itself.

The underlying problems are solved according to the present invention in that the housing of the basic transmission includes on the output side inwardly thereof a sleeve or bush extension and outwardly thereof a flanged part for the emplacement and fastening of a first additional auxiliary housing, in that for purposes of extending the drive or input shaft of a first auxiliary gear through a part of the basic transmission the driven or output shaft of the basic transmission is constructed as hollow shaft and is adapted to be closed off at the end by a disengageable sealing plug, and in that the drive or input shaft of the basic transmission includes at its end facing the output a plug connection or the like for the connection of the drive or input shaft of a first auxiliary gear. The present invention thereby contemplates an auxiliary transmission with a planetary gear set and with only a single servo device. A solution is thereby preferred, according to which the sun gear represents the input, the planetary gear carrier the output and the ring gear the reaction member. It is additionally proposed thereby that the output shaft of the first auxiliary gear is adapted to be slipped over the entrainment or spline teeth of the output shaft of the basic transmission. One may then proceed correspondingly with the addition of a further auxiliary gear, i.e., the output shaft of the second auxiliary gear can then be placed over the output shaft of the first auxiliary gear.

The construction according to the present invention entails the advantage that with relatively few additional parts, the basic transmission can be enlarged by one or two speeds or transmission ratios. In practice, the individual parts of the auxiliary gear are each only flangedly connected to or inserted, i.e., plugged into the basic transmission. An extraordinarily simple assembly and repair results in this manner. A further simplification resides in the fact that in every case the output shaft of the basic transmission remains also the output shaft of the auxiliary gear so that without any further difficulties, for example, the parking brake and the controller and also the tachometer drive as well as a possibly necessary secondary pump may already be provided in the basic transmission and may also remain thereat. As a result thereof one attains for all the parts contained in this basic transmission, a considerable number of parts for the series production, which leads to a great reduction in costs. This is also true generally for the parts of the auxiliary gear. However, the possibility remains preserved in connection therewith to deviate in exceptional cases, for example, in case of a second auxiliary gear, from the diameter of the basic transmission or of the first auxiliary gear and to match the same to the required transmission ratios and loads.

In one preferred embodiment according to the present invention, the first auxiliary transmission is arranged in a pot-shaped housing closed toward the input side, which is slipped with a hub portion over the sleeve extension at the housing of the basic transmission and is closed off in the direction toward the output side by a cover. The construction then takes place according to the present invention in such a manner that the drive shaft of the first auxiliary gear is extended beyond the housing thereof up to the connecting place in the basic transmission and is provided at this end with entrainment or spline teeth for the insertion into the plug-connection of the basic transmission. Furthermore, according to the present invention, in the first auxiliary gear the output shaft may be constructed as hollow shaft precisely as in the basic transmission, may be provided externally with entrainment or spline teeth and the drive shaft is then provided at its end facing the output with a plug connection for the insertion of a second auxiliary gear.

Of course, several possibilities exist for the construction of the second auxiliary transmission. The first possibility--as has already been mentioned hereinabove--resides in that according to the present invention a second auxiliary transmission is connected to the first auxiliary transmission, which second auxiliary gear has the same basic construction as the first auxiliary gear. In that case, the input of the second auxiliary gear is then connected with the input of the first auxiliary gear and the output of the second auxiliary gear with the output of the first auxiliary gear. Another possibility resides in the fact that according to the present invention, a second auxiliary gear is connected to the first auxiliary gear, which second auxiliary gear cooperates with the first auxiliary gear as coupling transmission. In that case, the possibility exists to connect with each other again the output of both auxiliary gears while the reaction member of the first auxiliary gear, however, is coupled with the input of the second auxiliary gear.

It is additionally proposed by the present invention that the second auxiliary gear is arranged in a housing of the same basic construction as the first auxiliary gear and that the housing of the second auxiliary gear is attached at the housing of the first auxiliary gear mirror-image-like to the housing of the first auxiliary gear. A type of construction which is closed in itself is achieved in this manner exclusively by means of the two housings of the auxiliary gears without requiring any separate covers.

Accordingly, it is an object of the present invention to provide an automatic planetary gear change-speed transmission for motor vehicles which avoids by simple means the aforementioned shortcomings and drawbacks encountered in the prior art.

Another object of the present invention resides in an automatic change-speed transmission for motor vehicles which can be enlarged into transmissions with additional speeds by extremely simple means.

A further object of the present invention resides in an automatic change-speed gear for motor vehicles which results in a simplification in manufacture, stocking of spare parts, and assembly and repair of the transmission though so constructed that it can be readily enlarged into a transmission having additional speeds by the attachment of an auxiliary gear or gears.

A still further object of the present invention resides in an automatically shifted change-speed gear for motor vehicles which can be enlarged in a building-block-like manner by the addition of one, two or more auxiliary gears, yet permits as many individual parts as possible to remain the same, particularly in the basic transmission.

Still another object of the present invention resides in a change-speed transmission of the type described above in which the basic transmission remains an independent unit capable of proper operation by itself, even though it is also adapted to be readily enlarged by the addition of one or several auxiliary transmissions.

A further object of the present invention resides in a multi-speed change-speed gear which consists of a basic transmission that can be enlarged to provide an additional speed or additional speeds by the connection of an additional gear or gears which are merely flangedly connected to and plugged into the existing basic transmission.

Still a further object of the present invention resides in a basic transmission of the type described above which can be enlarged to provide an additional speed or speeds by the connection of an additional auxiliary gear or gears, yet results in an extremely simple assembly of the transmission, capable of extremely simple repair.

These and other objects, features and advantages of the present invention will become more apparent from the following description when taken in connection with the accompanying drawing which shows, for purposes of illustration only, several embodiments in accordance with the present invention, and wherein:

FIG. 1 is a schematic view of the construction of a three-speed basic transmission in accordance with the present invention;

FIG. 1a is the shifting diagram of the transmission of FIG. 1;

FIG. 2 is a schematic view of the construction of a four-speed transmission in accordance with the present invention;

FIG. 2a is a shifting diagram for the transmission of FIG. 2;

FIG. 3 is a partial cross-sectional view through the transmission according to FIG. 2;

FIG. 4 is a schematic view of a five-speed transmission according to thhe present invention;

FIG. 4a is a shifting diagram of the transmission of FIG. 4;

Figures 5, 5A:
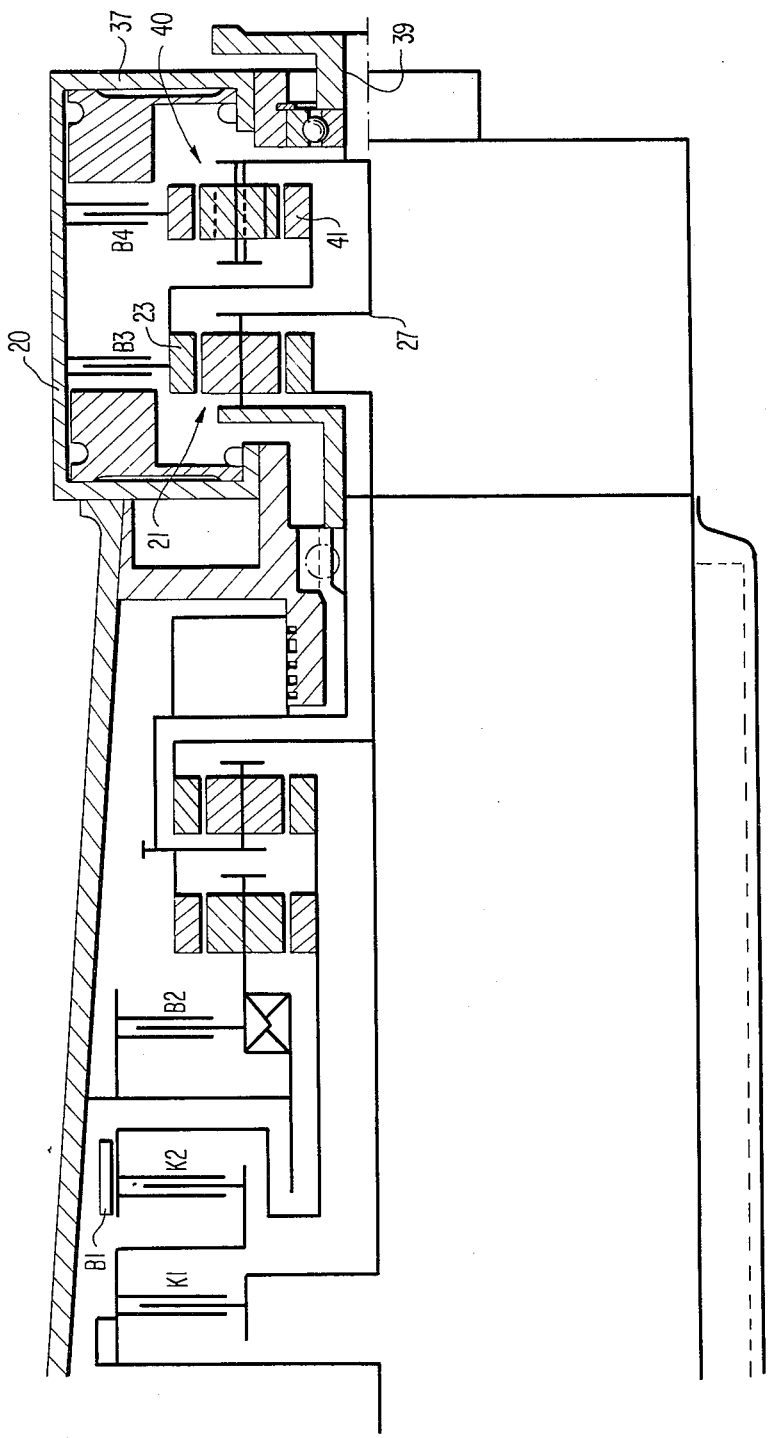
FIG. 5 is a schematic view of a modified embodiment of a five-speed transmission in accordance with the present invention.
FIG. 5a is a shifting diagram for the transmission of FIG. 5.

Referring now to the drawing wherein like reference numerals are used throughout the various views to designate like parts, and more particularly to FIG. 1, the basic transmission is arranged according to this figure in a housing 10 and is constructed in a conventional manner as so-called Simpson gear. Since this type of transmission is known as such in the art, a detailed description of its construction and of its shifting operation is dispensed with herein; for the sake of clarity, the shifting operation of this transmission is indicated schematically in the shifting diagram of FIG. 1a where $x$ indicates the particular clutch (K) or brake (B) engaged to obtain a given speed.

The output shaft 11 of the basic transmission is bored hollow and is sealed off against the outside by a plug 12. A three-arm flange 13 is mounted over the entrainment teeth, for example, in the form of spline teeth, at the end thereof, which three-arm flange further transmits the drive to the rear axle by way of the joint shaft. Furthermore, the pressure controller 14 of the automatic transmission, which is of conventional construction and therefore not described in detail herein, is arranged at the output shaft 11. Additionally, the parking lock or parking brake 15 and the tachometer drive pinion which are also of conventional construction, are provided on the inside of the transmission housing 10 at the transmission output.

For purposes of the connection of an auxiliary additional gear, the housing 10 is provided with a bushing or sleeve extension 16 extended in the direction toward the output side which receives therewithin the bearing support and seal. At the outer circumference thereof, the housing 10 includes a flange 17 which is intended to facilitate the connection of an auxiliary gear. Finally, the drive shaft 18 of the transmission which is operable in all forward speeds is additionally provided at its end facing the output with a plug connection 19 which is of any conventional construction and therefore not illustrated again in detail, in order that the input or drive shaft of the auxiliary gear can be connected thereat. Any known type of construction may be used for this plug connection 19, though one typical construction appropriate for the present invention will be explained more fully hereinafter.

According to FIG. 2, the housing 20 of the first auxiliary gear 21 is now mounted over the sleeve extension 16 of the housing 10 and is secured with the aid of the flange connection 17. The auxiliary gear 21 is a simple planetary gear set, whose sun gear forms the input and whose carrier 22 serves as output. The ring gear 23 serves as reaction member and is adapted to be held fast with the aid of a brake $B_3$. The housing 20 is closed off in the direction toward the output side by a cover 24.

The drive or input shaft 25 of the auxiliary gear 21 is extended toward the basic transmission and extends through the hollow output shaft 11 thereof, on the entrainment teeth of which is now mounted, in lieu of the three-arm flange 13 of FIG. 1, the planetary gear carrier 22 as output of the auxiliary gear 21. At the forward end thereof, the input shaft 25 engages in the plug connection 19. For the connection of a second auxiliary gear, this drive shaft 25 is equipped at its end facing the output with a further plug connection 26 again of any conventional construction. The output shaft 27 of the auxiliary gear 21, in its turn, is again constructed as hollow shaft and is closed off by the sealing plug 28. A three-arm flange 29 is now again mounted on its entrainment or spline teeth.

According to FIG. 3, the plug connection generally designated by reference numeral 19 may be constituted in that the drive or input flange 30 in the basic transmission is provided inwardly thereof with a hub member 31 which, in its turn, is provided internally with entrainment teeth 32, for example, in the form of spline teeth. The drive or input shaft 18 of the basic transmission is now inserted into this hub portion 31 from in front thereof and the drive or input shaft 25 of the auxiliary gear 21 is now inserted into this hub portion 31 from the rear thereof so that both input shafts 18 and 25 are non-rotatably connected with each other by the splineteeth arrangement. This input shaft 25 now drives according to the arrangement of FIG. 2, the sun gear 33 of the first auxiliary gear 21, i.e., the sun gear 33 is cut directly into the drive shaft 25. The brake $B_3$ of the auxiliary gear 21 is constructed as lamellae brake in a conventional manner. It is actuated by the actuating piston 34 whose construction and arrangement forms no part of the present invention and therefore is not described in detail herein.

In contradistinction to the embodiment according to FIG. 2, the input shaft 25 is not provided with a further plug connection at its end facing the output. Instead, it is supported at this end in the output shaft 27 with the aid of a slide bush 35, whereby the output shaft 27, in its turn, is also not constructed as hollow shaft.

According to FIG. 4, the auxiliary gear generally designated by reference numeral 36 has the same construction as the auxiliary gear generally designated by reference numeral 21 but deviates therefrom only with respect to the ratio of the size of the gears (not visible from the drawing). The auxiliary gear 36 is arranged in a housing 37 which has the same construction as the housing 20 of the first auxiliary gear 21 and which is arranged symmetrically mirror-image-like with respect to the same. The input shaft 38 of the second auxiliary gear 36 is again extended through the hollow output shaft 27 of the first auxiliary gear 21 and is connected by means of a plug connection 26 with the input shaft 25 of the first auxiliary gear 21. The output shaft 39 of the second auxiliary gear 36 is operatively connected in exactly the same manner as in FIG. 2 with the output shaft 27 of the first auxiliary gear 21. The shifting operation of this transmission can be readily seen from the shifting diagram of FIG. 4a.

Whereas, according to FIG. 4, the first and the second auxiliary gear have the same basic construction, FIG. 5 illustrates an arrangement according to which the two auxiliary gears generally designated by reference numerals 21 and 40 cooperate with each other by way of a different type of coupling connection. The arrangement of the housings 20 and 37 and also the construction thereof is the same. Furthermore, also the construction of the output shaft 39 as well as the connection thereof with the output shaft 27 of the first auxiliary gear 21 remains in principle the same. However, the sun gear 41 is now connected as input member of the second auxiliary gear 40 with the reaction member, namely, with the ring gear 23 of the first auxiliary gear 21. The shifting of the second auxiliary gear 40 takes place by way of the brake $B_4$ and the shifting operation is exactly the same as with the arrangement according to FIG. 4, as indicated by the shifting diagram of FIG. 5a. The interconnection of the two auxiliary gears 21 and 40 of FIG. 5 merely produces more favorable gear sizes and transmission ratios. Additionally, it should also be pointed out that by reason of the symmetrical, mirror-image-like housing arrangement according to FIGS. 4 and 5, a separate closure cover is not necessary.

Each additional housing may contain the shifting and control elements additionally necessary for the shifting of the transmission. However, it is also within the scope of the present invention to accommodate the elements necessary at least for the first enlarging stage still in the main transmission housing 10.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. An automatic change-speed transmission for motor vehicles which includes a basic transmission means providing three speeds and prepared for the connection with an auxiliary gear means, a uniform housing means for the basic transmission means, and control means within said housing means for the operation of the transmission, characterized in that the housing means of the basic transmission means is provided on the output side inwardly thereof with a sleeve-like extension means and outwardly thereof with a flange means for the emplacement and fastening of a first auxiliary housing means, said basic transmission means including an input shaft and an output shaft, said output shaft being constructed as hollow shaft for extending therethrough an input shaft of a first auxiliary gear means, said hollow output shaft of the basic transmission means being adapted to be closed at the end thereof by a detachable sealing plug means, the input shaft of the basic transmission means being provided at its end facing its output with a plug-type connection means for the connection of the input shaft of a first auxiliary gear means.

2. A change-speed transmission according to claim 1, characterized in that the uniform housing means contains all control means necessary for an independent functioning of at least the basic transmission means.

3. A change-speed transmission according to claim 2, characterized in that the control means include a pressure controller, a parking brake and shifting plate.

4. A change-speed transmission according to claim 3, characterized in that the change-speed transmission is an automatically shifting planetary gear change-speed transmission.

5. An automatic shifting change-speed transmission arrangement for motor vehicles which includes a basic transmission means for providing at least three speeds of operation, at least a first auxiliary gear means for providing at least one additional speed of operation, a uniform housing means for housing the basic transmission means, said uniform housing means having an input side and an output side, control means within said uniform housing means for controlling the operation of the basic transmission means, and an auxiliary housing means for housing the first auxiliary gear means, the arrangement being characterized in that a sleeve-like extension means is provided on the output side of the uniform housing means of the basic transmission means for mounting the auxiliary housing means, a flange means is provided on the uniform housing means radially outwardly of said sleeve-like extension means for fastening of the auxiliary housing means to said uniform housing means, said basic transmission means including an input shaft and an output shaft, said output shaft being constructed as a hollow shaft, the first auxiliary gear means includes an input shaft extending through said hollow output shaft of the basic transmission means, a detachable sealing plug means is provided for sealing the end of said hollow output shaft of the basic transmission means, and a plug-type connection means is provided at the input shaft of the basic transmission means at the end of the input shaft facing the output side of the transmission for connecting the input shaft of the first auxiliary gear means with the basic transmission means, and in that entrainment teeth means are provided on the output shaft of the basic transmission means, the first auxiliary gear means includes an output shaft means having complementary teeth means mounted over said entrainment teeth means for rotation in unison therewith.

6. A change-speed transmission arrangement according to claim 5, characterized in that the auxiliary gear housing means includes an input side and an output side, said auxiliary gear housing means is a pot-shaped housing means closed toward its input side and includes a hub portion mounted on the sleeve-like extension means of the basic transmission means, and in that a cover is provided for closing off the output side of the pot-shaped housing means.

7. A change-speed transmission arrangement according to claim 6, characterized in that the input shaft of the first auxiliary gear means extends beyond the auxiliary gear housing means and into the basic tranmission means, the input shaft of said auxiliary gear means is provided at the end thereof extending into the basic transmission means with entrainment teeth means for the insertion into the plug-type connection means of the basic transmission means.

8. A change-speed transmission arrangement according to claim 7, characterized in that the output shaft means of the first auxiliary gear means includes a hollow shaft, said lastmentioned hollow shaft is provided externally thereof with entrainment teeth means, the input shaft of the first auxiliary gear means is provided at its end facing the output side of the auxiliary gear housing means with a plug-type connection means for insertion of a second auxiliary gear means.

9. A change-speed transmission arrangement according to claim 8, characterized in that a second auxiliary gear means having an input and an output is provided and is connected to the first auxiliary gear means, the second auxiliary gear means having the same basic construction as the first auxiliary gear means, and in that the output shaft of the first auxiliary gear means is operatively connected with the output of the second auxiliary gear means, the input shaft of the first auxiliary gear means is operatively connected with the input of the second auxiliary gear means.

10. A change-speed transmission arrangement according to claim 8, characterized in that a second auxiliary gear means having an input and an output is provided and is connected to the first auxiliary gear means, the first auxiliary gear means includes a reaction member, the output shaft of said first auxiliary gear means and the output of said second auxiliary gear means are operatively connected with each other with the reaction member of the first auxiliary gear means being operatively connected with the output of the second auxiliary gear means.

11. A change-speed transmission arrangement according to claim 10, characterized in that the second auxiliary gear means is arranged in a housing means of substantially the same basic construction as the first auxiliary gear means, and in that the housing means of the second auxiliary gear means is attached at the housing of the first auxiliary gear means symmetrically mirror-image-like with respect thereto.

12. A change-speed transmission arrangement according to claim 11, characterized in that the uniform housing means of the basic transmission means contains all control means necessary for an independent functioning of at least the basic transmission means.

13. A change-speed transmission arrangement according to claim 9, characterized in that the second auxiliary gear means is arranged in a housing means of substantially the same basic construction as the first auxiliary gear means, and in that the housing means of the second auxiliary gear means is attached at the housing of the first auxiliary gear means symmetrically mirror-image-like with respect thereto.

14. A change-speed transmission arrangement according to claim 13, characterized in that the uniform housing means of the basic transmission means contains all control means necessary for an independent functioning of at least the basic transmission means.

15. A change-speed transmission arrangement according to claim 1, characterized in that a first auxiliary gear means and an auxiliary gear housing means for housing the same are provided, said auxiliary gear housing means having an input side and an output side, and in that the auxiliary gear housing means is a pot-shaped housing means closed toward its input side and includes a hub portion mounted on the sleeve-like extension means of the basic transmission means, and a cover is provided for closing off the output side of the pot-shaped housing means.

16. A change-speed transmission arrangement according to claim 5, characterized in that the input shaft of the first auxiliary gear means extends beyond the auxiliary gear housing means and into the basic transmission means, the input shaft of said auxiliary gear means is provided at the end thereof extending into the basic transmission means with entrainment teeth means for the insertion into the plug-type connection means of the basic transmission means.

17. A change-speed transmission arrangement according to claim 1, characterized in that a first auxiliary gear means including an output means is provided, the output means of the first auxiliary gear means includes a hollow shaft, said last-mentioned hollow shaft is provided externally thereof with entrainment teeth means, the input shaft of the first auxiliary gear means is provided at its end facing the output with a plug-type connection means for insertion of a second auxiliary gear means.

18. A change-speed transmission arrangement according to claim 1, characterized in that a first auxiliary gear means having an input and an output and a second auxiliary gear means having an input and an output are provided, the second auxiliary gear means is connected to the first auxiliary gear means, the second auxiliary gear means having the same basic construction as the first auxiliary gear means, and in that the output of the first auxiliary gear means is operatively connected with the output of the second auxiliary gear means, the input of the first auxiliary gear means is operatively connected with the input of the second auxiliary gear means.

19. A change-speed transmission arrangement according to claim 18, characterized in that the second auxiliary gear means is arranged in a housing means of substantially the same basic construction as the first auxiliary gear means, and in that the housing means of the second auxiliary gear means is attached at the housing of the first auxiliary gear means symmetrically mirror-image-like with respect thereto.

20. A change-speed transmission arrangement according to claim 1, characterized in that a first auxiliary gear means having an input and an output and a second auxiliary gear means having an input and an output are provided, the second auxiliary gear means is connected to the first auxiliary gear means, the first auxiliary gear means includes a reaction member, and in that the first and second auxiliary gear means are operatively connected with each other with the reaction member of the first auxiliary gear means being operatively connected with the output of the second auxiliary gear means.

21. A change-speed transmission arrangement according to claim 20, characterized in that the second auxiliary gear means is arranged in a housing means of substantially the same basic construction as the first auxiliary gear means, and in that the housing means of the second auxiliary gear means is attached at the housing of the first auxiliary gear means symmetrically mirror-image-like with respect thereto.

22. A change-speed transmission arrangement according to claim 1, characterized in that a first auxiliary gear means having an input shaft and an auxiliary gear housing means for housing the first auxiliary gear means are provided, the input shaft of the first auxiliary gear means is extended beyond the auxiliary gear gear housing means and into the basic transmission means, the input shaft of said auxiliary gear means is provided at the end thereof extending into the basic transmission means with entrainment teeth means for the insertion into the plug-type connection means of the basic transmission means.

23. An automatic transmission arrangement having an input side and an output side, the arrangement comprising: a basic transmission means for providing at least three speeds of operation, said basic transmission means including an input shaft, an output shaft, and control means for controlling the operation of the transmission including a pressure controller means, a shifting plate means, and a parking brake means, a housing means for housing the transmission means and the control means so as to be a completely functionally independent automatic transmission, said housing means including a sleeve-like extension means formed at the output side of the transmission for mounting at least one independent auxiliary gear means, a flange means provided on said housing means radially outwardly of said sleeve-like extension means for fastening of an auxiliary gear housing means, said output shaft means including a hollow shaft means for receiving an input of the auxiliary gear means, and connection means provided at the end of said input shaft means of said basic transmission means for connecting the input shaft of the first auxiliary gear means to the input shaft means of said basic transmission means.

24. An arrangement according to claim 23, wherein a first auxiliary gear means having an input shaft is provided, and wherein said connection means includes an input flange means for non-rotatably connecting said input shaft means of said transmission means to said input shaft of said first auxiliary gear means.

25. An arrangement according to claim 24, wherein said input flange means includes a hub portion extending in the direction of the input side of the transmission and overlying portions of said input shaft means of said basic transmission means and said input shaft of said first auxiliary gear means, said hub portion being provided on an internal surface thereof with entrainment teeth, and said input shaft means of said basic transmission means and said input shaft means of said first auxiliary gear means include complementary teeth means for meshing with said entrainment teeth means.

26. An arrangement according to claim 25, wherein an auxiliary gear housing means for housing said first auxiliary gear means is provided, said first auxiliary gear means including an output shaft, means are provided for rotatably supporting said output shaft in said auxiliary gear housing means, said output shaft of said first auxiliary gear means is provided with entrainment teeth, and wherein a multi-armed flange means is provided for transmitting drive from the transmission, said multi-armed flange means being provided with complementary teeth means for meshing with said entrainment teeth means of said output shaft of said first auxiliary gear means.

27. An arrangement according to claim 25, wherein an auxiliary gear housing means is provided for housing said auxiliary gear means, said auxiliary gear means includes a hollow output shaft for accommodating an input of a second auxiliary gear means, and wherein a detachable sealing means is provided for sealing an end of said hollow output shaft of said first auxiliary gear means.

28. An arrangement according to claim 25, wherein a second auxiliary gear means having an input shaft and an output shaft is provided, a second auxiliary gear housing means is provided for accommodating said second auxiliary gear means, said first auxiliary gear means includes a hollow output shaft for insertion of said input shaft of said second auxiliary gear means, a second connection means for connecting the input shaft of said first auxiliary gear means with the input of said second auxiliary gear means is provided, and wherein means are provided for operatively connecting said output shaft of said first auxiliary gear means to said second auxiliary gear means.

29. An arrangement according to claim 25, wherein a second auxiliary gear means having an input and an output is provided, a second auxiliary gear housing means is provided for accommodating said second auxiliary gear means, said first auxiliary gear means includes a hollow output shaft for insertion of said input of said second auxiliary gear means and a reaction member, and wherein the input of said second auxiliary gear means is operatively connected with the input shaft of said first auxiliary gear means and said output of said second auxiliary gear means is operatively connected with said output shaft of said first auxiliary gear means, and wherein said reaction member is operatively connected with the output of said second auxiliary gear means.

* * * * *